(12) United States Patent
Kuhn et al.

(10) Patent No.: US 6,901,366 B1
(45) Date of Patent: *May 31, 2005

(54) SYSTEM AND METHOD FOR ASSESSING TV-RELATED INFORMATION OVER THE INTERNET

(75) Inventors: Roland Kuhn, Santa Barbara, CA (US); Jean-Claude Junqua, Santa Barbara, CA (US); Tony Davis, Santa Barbara, CA (US); Weiying Li, Montreal (CA); Yi Zhao, Goleta, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/383,763

(22) Filed: Aug. 26, 1999

(51) Int. Cl.$^7$ .......................... G01L 21/00; G01L 15/18
(52) U.S. Cl. .................. 704/275; 704/257; 704/270
(58) Field of Search ........................... 704/9, 251, 257, 704/258, 260, 270, 270.1, 275; 709/217–219; 348/460, 468, 473, 569

(56) References Cited

U.S. PATENT DOCUMENTS

| | | | | |
|---|---|---|---|---|
| 5,774,859 A | * | 6/1998 | Houser et al. | 704/275 |
| 5,809,471 A | * | 9/1998 | Brodsky | 704/275 |
| 5,819,220 A | * | 10/1998 | Sarukkai et al. | 704/243 |
| 5,884,262 A | * | 3/1999 | Wise et al. | 704/270.1 |
| 6,108,706 A | * | 8/2000 | Birdwell et al. | 709/229 |
| 6,209,028 B1 | * | 3/2001 | Walker et al. | 709/219 |
| 6,263,505 B1 | * | 7/2001 | Walker et al. | 725/110 |
| 6,266,094 B1 | * | 7/2001 | Taylor, Jr. | 348/452 |
| 6,330,537 B1 | * | 12/2001 | Davis et al. | 704/257 |

FOREIGN PATENT DOCUMENTS

| | | |
|---|---|---|
| EP | 0 853 287 A2 | 7/1998 |
| EP | 0 895 396 A2 | 2/1999 |
| WO | WO 99/38321 | 7/1999 |

OTHER PUBLICATIONS

Hemphill et al, "Speech–Aware Multimedia", IEEE Multimedia, vol. 3(1), 1996, pp. 74–78.*

Arons, "Hyperspeech: Navigating in Speech–only Hypermedia", 1991, Proc. 3rd Annual ACM Conference on Hypertext, pp. 133–146.*

"Will ReplayTV make me more popular?, And Other Frequently Asked Questions"; promotional material, www.replaytv.com/replaytv/faq.htm#q7;Aug. 24, 1999, pp. 1–3.

P.J. Wyard, A.D. Simons, S. Appleby, E. Kaneen, S.H. Williams and K.R. Preston, "Spoken Language Systems—Beyond Prompt and Response", BT Technology Journal, vol. 14, No. 1, Jan. 1996, pp. 187–205.

* cited by examiner

*Primary Examiner*—Richemond Dorvil
*Assistant Examiner*—Angela Armstrong
(74) *Attorney, Agent, or Firm*—Harness, Dickey & Pierce, PLC

(57) ABSTRACT

The system retrieves information from the internet using multiple search engines that are simultaneously launched by the search engine commander. The commander is responsive to a speech-enabled system including a speech recognizer and natural language parser. The user speaks to the system in natural language requests, and the parser extracts the semantic content from the user's speech, based on a set of goal oriented grammars. The preferred system includes a fixed grammar and an updatable or downloaded grammar, allowing the system to be used without extensive training and yet capable of being customized for a particular user's purposes. Results obtained from the search engines are filtered based on information extracted from an electronic program guide and from prestored user profile data. The results may be displayed on screen or through synthesized speech.

13 Claims, 3 Drawing Sheets

SYSTEM AND METHOD FOR ASSESSING TV-RELATED INFORMATION OVER THE INTERNET

BACKGROUND AND SUMMARY OF THE INVENTION

The present invention relates generally to interactive television and information retrieval. More particularly, the invention relates to a speech-enabled system whereby a users spoken requests for information are recognized, parsed and supplied to a search engine for retrieving information pertinent to the user's request.

The number and variety of TV programs available to viewers is growing rapidly. Thus viewers require a rapid, user-friendly way of searching for broadcasts that suit their tastes and needs. Much information about TV programs is available on various Internet sites, but access to those sites requires logging onto a computer and typing in key words.

Ideally, the user would like to be able to obtain information from Internet sites while he or she is using the television, by making spoken requests to the television and having it obtain the requested information. Thus a user could simply tell the television what he or she wants to see: "Show me any international water polo event", for example, and the TV would access the Internet to find out when and on what channel such a program is broadcast. Using the information as downloaded, the TV would also be able to answer questions about the broadcast such as "What teams are playing?"

By way of further example, the user, viewing a particular program about mountain climbing, might want more information about the tallest mountain peaks and when they were first climbed. The user would like to be able to ask the television to find answers to these questions and then display the results on screen or through synthesized spoken response.

Unfortunately, this type of sophisticated interaction with the television has not been possible. The present invention breaks new ground in this regard. The invention provides a speech recognition system with associated language parser that will extract the semantic content or meaning from a user's spoken command or inquiry, and formulate a search request suitable for supplying to one or more internet search engines. The parser contains a reconfigurable grammar by which it can understand the meaning of a users spoken request within a given context. The grammar itself may be reconfigured via the Internet, based on knowledge of what the user is currently viewing. This knowledge may be supplied by electronic program guide or as part of the digital television data stream.

The results obtained from the search engines may be further analyzed by the parser, to select the most likely candidates that respond to the users original inquiry. These results are then provided to the user on screen or through synthesized speech, or both.

For a more complete understanding of the invention, its objects and advantages, refer to the following specification and to the accompanying drawings.

DESCRIPTION OF THE PREFERRED EMBODIMENT

Figure 1:
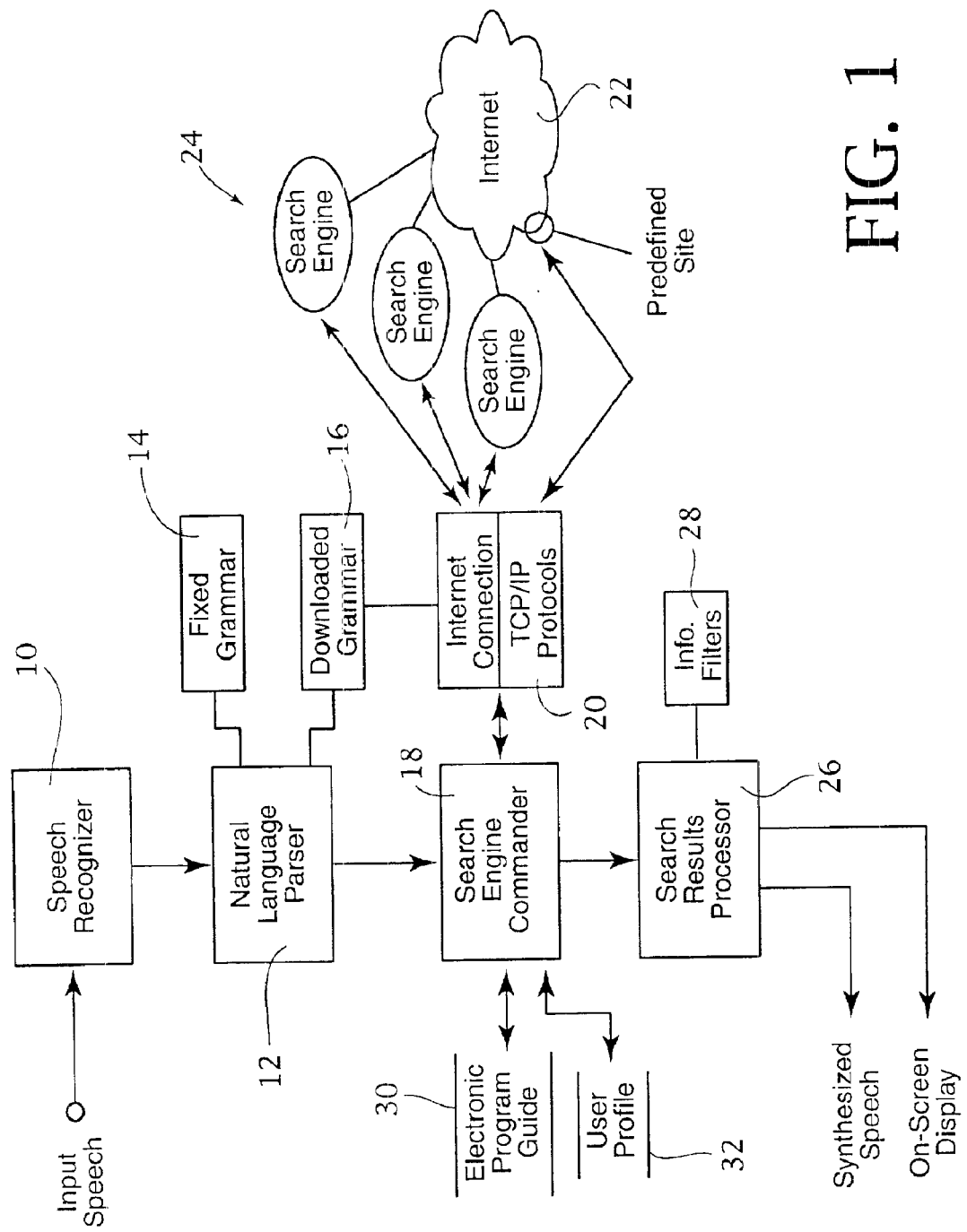
FIG. 1 is a block diagram of the presently preferred embodiment of the invention.

Referring to FIG. 1, a presently preferred embodiment of the speech-enabled information access system comprises a speech recognizer 10 to which input speech is supplied through suitable microphone interface. In this regard, the microphone can be attached by cable or coupled through wireless connection to speech recognizer 10. The microphone may be packaged, for example, within the handheld remote of a television or other information appliance.

The output of speech recognizer 10 is coupled to natural language parser 12. The natural language parser extracts the semantics or meaning from the spoken words, phrases and sentences supplied by the user. As will be discussed more fully below, natural language parser 10 works with a set of pre-defined grammars that are preferably constructed based on goal-oriented tasks. In the presently preferred embodiment these grammars may be categorized as one of two types: a fixed grammar 14 and a downloaded grammar 16.

The fixed grammar represents a pre-defined set of goal-oriented tasks that the system is able to perform immediately upon installation. For example, the fixed grammar would allow the natural language parser to understand sentences such as "Please find me an international water polo event."

Expanding upon the fixed grammar, an optional, downloaded grammar 16 can be added to the system, giving the natural language parser the ability to understand different classes of sentences not originally provided for in the original package. These additional downloaded grammars can be used to expand the capability of the system periodically (when the system manufacturer develops new enhancements or new features) or to add third-party enhancements that the user may be particularly interested in.

For example, if a particular user is interested in playing chess interactively with users around the world, the downloaded grammar can be augmented to include the necessary grammars to give chess move commands to the system.

Much of the power underlying the system comes from its ability to access the rich information content found on the internet. The system includes a search engine commander 18 which receives semantic instructions from natural language parser 12. The search engine commander lies at the hub of a number of information handling processes. The search engine commander is coupled to the internet connection module 20, which has suitable TCP/IP protocols necessary for communication with a suitable service provider giving access to the internet 22. The search engine commander formulates search requests, based on the user's input as derived by the natural language parser 12. The commander 18 formulates search requests to be suitable for handing off to one or more search engines that are maintained by third parties on the internet. In FIG. 1 three search engines are shown at 24. Examples of suitable search engines include: Yahoo, AltaVista, Excite, Lycos, GoTo, and so forth. In essence, the search engine commander 18 communicates with all of the search engines in parallel, sending each of them off on the task of locating information responsive to the user's spoken inquiry.

The search engines, in turn, identify information found on the internet that respond to the user's request. Typically, search engines of this type return a priority score or probability score indicative of how likely the retrieved information is responsive to the user's request. In this regard, different search engines use different algorithms for determining such probabilities. Thus having the ability to access multiple search engines in parallel improves the richness of the information retrieved. In other words, not all search engines will return the same information for every inquiry made, but the combined effect of using search engines produces richer results than any single search engine alone.

The search engines return a list of links (e.g., hypertext links or URL addresses) that are responsive to the request. Typically, the returned information is sorted by probability score, so that the sites most likely to contain relevant information are presented first.

The returned results are fed back to search engine commander 18, and search engine commander 18, in turn, passes the results to the search results processor 26 for filtering. Typically a user of this system does not want to see every piece of information identified by the search engines. Rather the user is typically interested in the best one or two information resources. To filter the results, search engine processor 26 may have optional information filters 28 that are based on user-defined preferences. These filters help processor 26 determine which responses are likely to be more interesting to the user and which responses should be discarded. The presently preferred embodiment updates these information filters on a per-user basis, based on historical data gathered as the user makes use of the system.

A very important item of information in filtering the search results comes from the knowledge of what the user is currently viewing. This information is extracted from an electronic program guide, which may be locally stored as at 30 for access by the search engine commander. The electronic program guide contains information about each program that is available for viewing over a pre-defined time interval. The guide includes the date and time of the program, the program title, and other useful information such as what category the program falls into (e.g., comedy, drama, news, sports, etc.), what actors star in the program, who directed the program, and so forth. Often this information is relevant in determining what information the user is interested in retrieving.

For example, if the user is watching a movie starring Marilyn Monroe, the user may be interested in learning more about this actress' life. The user could thus ask the system to "Tell me more about the main actress' life" and the system would ascertain from the electronic program guide that the actress is Marilyn Monroe.

The information contained in the electronic program guide can be used in multiple ways. The search engine commander can make use of this information in formulating its requests for information that are sent to the search engines 24. In addition, when the information is returned by the search engines, the search engine commander 18 can pass the relevant electronic program guide data down to the search results processor 26 along with the search results. This allows the search results processor to use relevant electronic program guide information in filtering the results obtained.

Because the electronic program guide changes over time, it is necessary to update the contents of the electronic program guide data store 30 on a periodic basis. The search engine commander does this automatically by accessing the internet. Alternatively, if desired, the electronic program guide information can be obtained through the television system's cable or satellite link.

While the system described above has the ability to access any information available on the internet, a particularly robust embodiment can be implemented by designating certain pre-defined sites that contain information the user has selected as being of interest, or sites designated by the system manufacturer as containing information of interest to most viewers. Information retrieved from such pre-designated sites can be retrieved and communicated to the user more quickly, because there is no need to invoke search engines to scour the entire body of information available on the Internet.

By way of illustration, the system may be pre-configured to access an on-line encyclopedia Internet site which is used to supply commonly requested information about programs the user is viewing. For example, if the user is watching a movie about India, the system might automatically retrieve relevant statistics about that country and provide them on screen in response to a user's request.

An interesting enhancement of this capability involves the presentation of multimedia data or streaming data from the pre-selected internet web site. By providing screening data, the user is given the experience of actually viewing the supplemental material as a film clip or animation. Such film clips or animations could be viewed, for example, during commercial breaks. Alternatively, if the user is enjoying a television system that provides video on demand, the user could temporarily suspend transmission of the original program to allow viewing of the supplemental information provided from the pre-defined internet site.

The search engine commander, itself, maintains a user profile data store 32 that may be used to further enhance the usefulness of the system. User preferences stored in the user profile data store can be combined with information in the electronic program guide to generate search requests automatically. Thus, if the system has ascertained from previous usage that the viewer is interested in certain international events, the search engine commander will automatically send requests for relevant information and can cause the relevant information to be displayed on the screen, depending on whether such information is suitable in the current viewing context. For example, if important news about a viewers home country is found, it could be displayed on screen while the international news is being viewed. The same message might be suppressed if the viewer is watching a movie that may be simultaneously being recorded.

Figure 2:
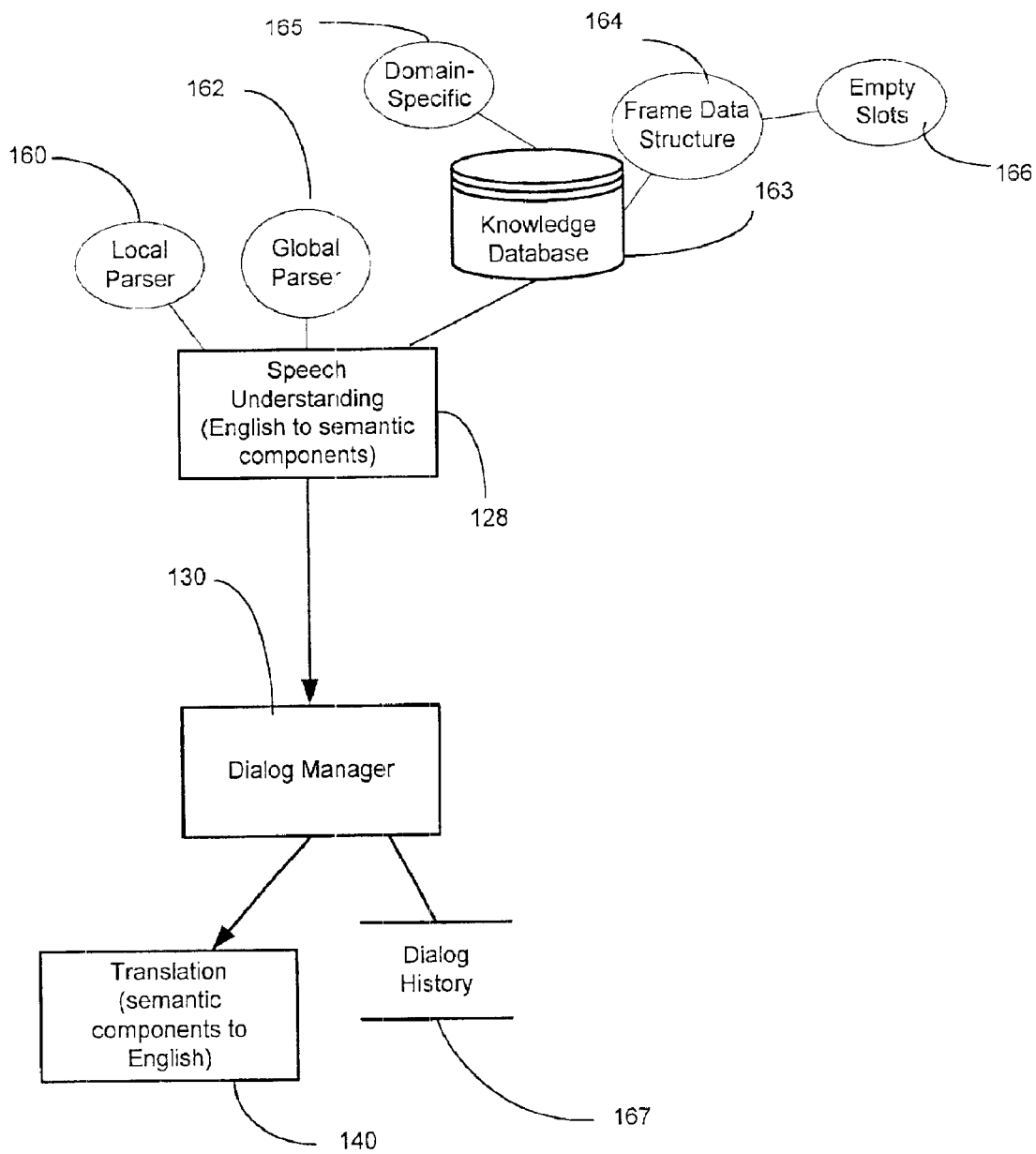
FIG. 2 is a block diagram depicting the components of the natural language parser of the presently preferred embodiment of the invention.

The presently preferred embodiment uses a natural language parser that is goal-oriented. FIG. 2 depicts components of the natural language parser 12 in more detail. In particular, speech understanding module 128 includes a local parser 160 to identify predetermined relevant task-related fragments. Speech understanding module 128 also includes a global parser 162 to extract the overall semantics of the speaker's request.

The local parser 160 utilizes in the preferred embodiment small and multiple grammars along with several passes and a unique scoring mechanism to provide parse hypotheses. For example, the novel local parser 160 recognizes according to this approach phrases such as dates, names of people, and movie categories. If a speaker utters "tell me about a comedy in which Mel Brooks stars and is shown before January 23rd", the local parser recognizes: "comedy" as being a movie category; "January 23rd" as a date; and "Mel Brooks" as an actor. The global parser assembles those items (movie category, date, etc.) together and recognizes that the speaker wishes to retrieve information about a movie with certain constraints.

Speech understanding module 128 includes knowledge database 163 which encodes the semantics of a domain (i.e., goal to be achieved). In this sense, knowledge database 163 is preferably a domain-specific database as depicted by reference numeral 165 and is used by dialog manager 130 to determine whether a particular action related to achieving a predetermined goal is possible.

The preferred embodiment encodes the semantics via a frame data structure 164. The frame data structure 164 contains empty slots 166 which are filled when the semantic interpretation of global parser 162 matches the frame. For example, a frame data structure (whose domain is tuner commands) includes an empty slot for specifying the viewer-requested channel for a time period. If viewer 120 has provided the channel, then that empty slot is filled with that information. However, if that particular frame needs to be filled after the viewer has initially provided its request, then dialog manager 130 instructs the computer response module to ask the viewer to provide a desired channel.

The frame data structure 164 preferably includes multiple frames which each in turn have multiple slots. One frame may have slots directed to attributes of a movie, director, and type of movie. Another frame may have slots directed to attributes associated with the time in which the movie is playing, the channel, and so forth.

The following reference discusses global parsers and frames: R. Kuhn and R. D. Mori, *Spoken Dialogues with Computers* (*Chapter 14: Sentence Interpretation*), Academic Press, Boston (1998).

Dialog manager 130 uses dialog history data file 167 to assist in filling in empty slots before asking the speaker for the information. Dialog history data file 167 contains a log of the conversation which has occurred through the device of the present invention. For example, if a speaker utters "I'd like to watch another Marilyn Monroe movie," the dialog manager 130 examines the dialog history data file 167 to check what movies the user has already viewed or rejected in a previous dialog exchange. If the speaker had previously rejected "Some Like It Hot", then the dialog manager 130 fills the empty slot of the movie title with movies of a different title. If a sufficient number of slots have been filled, then the present invention will ask the speaker to verify and confirm the program selection. Thus, if any assumptions made by the dialog manager 130 through the use of dialog history data file 167 prove to be incorrect, then the speaker can correct the assumption.

The natural language parser 12 analyzes and extracts semantically important and meaningful topics from a loosely structured, natural language text which may have been generated as the output of an automatic speech recognition system (ASR) used by a dialogue or speech understanding system. The natural language parser 12 translates the natural language text input to a new representation by generating well-structured tags containing topic information and data, and associating each tag with the segments of the input text containing the tagged information. In addition, tags may be generated in other forms such as a separate list, or as a semantic frame.

Robustness is a feature of the natural language parser 12 as the input can contain grammatically incorrect English sentences, due to the following reasons: the input to the recognizer is casual, dialog style, natural speech can contain broken sentences, partial phrases, and the insertion, omission, or mis-recognition of errors by the speech recognizer even when the speech input is considered correct. The natural language parser 12 deals robustly with all types of input and extracts as much information as possible.

Figure 3:
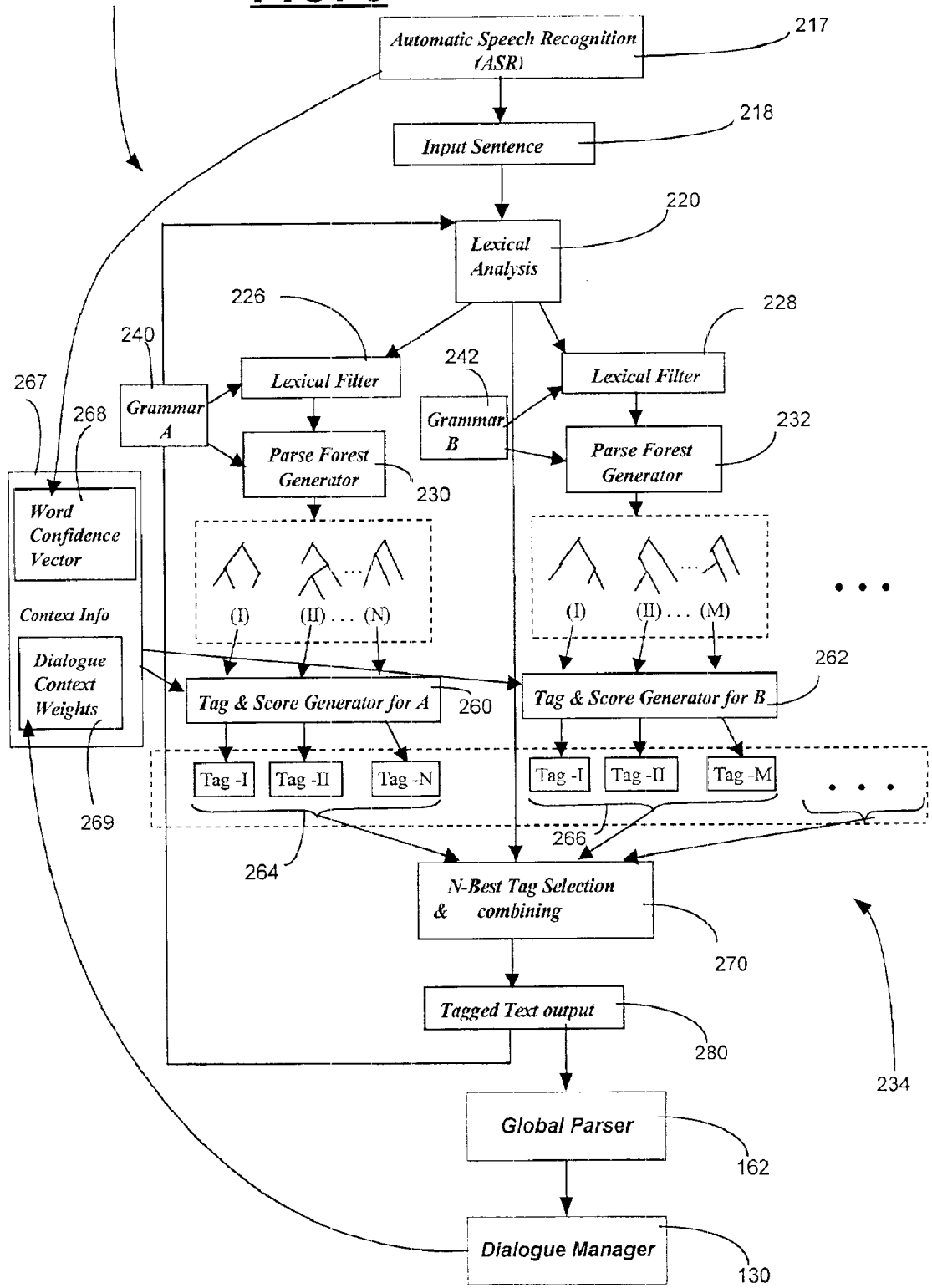
FIG. 3 is a block diagram depicting the components of the local parser of the presently preferred embodiment of the invention.

FIG. 3 depicts the different components of the local parser 160 of the natural language parser 24. The natural language parser 12 preferably utilizes generalized parsing techniques in a multi-pass approach as a fixed-point computation. Each topic is described as a context-sensitive LR (left-right and rightmost derivation) grammar, allowing ambiguities. The following are references related to context-sensitive LR grammars: A. Aho and J. D. Ullman, *Principles of Compiler Design*, Addison Wesley Publishing Co., Reading, Mass. (1977); and N. Tomita, *Generalized LR Parsing*, Kluwer Academic Publishers, Boston, Mass. (1991).

At each pass of the computation, a generalized parsing algorithm is used to generate preferably all possible (both complete and partial) parse trees independently for each targeted topic. Each pass potentially generates several alternative parse-trees, each parse-tree representing a possibly different interpretation of a particular topic. The multiple passes through preferably parallel and independent paths result in a substantial elimination of ambiguities and overlap among different topics. The generalized parsing algorithm is a systematic way of scoring all possible parse-trees so that the (N) best candidates are selected utilizing the contextual information present in the system.

Local parsing system 160 is carried out in three stages: lexical analysis 220; parallel parse-forest generation for each topic (for example, generators 230 and 232); and analysis and synthesis of parsed components as shown generally by reference numeral 234.

Lexical Analysis:

A speaker utters a phrase that is recognized by an automatic speech recognizer 217 which generates input sentence 218. Lexical analysis stage 220 identifies and generates tags for the topics (which do not require extensive grammars) in input sentence 218 using lexical filters 226 and 228. These include, for example, movie names; category of movie; producers; names of actors and actresses; and so forth. A regular-expression scan of the input sentence 218 using the keywords involved in the mentioned exemplary tags is typically sufficient at this level. Also, performed at this stage is the tagging of words in the input sentence that are not part of the lexicon of particular grammar. These words are indicated using an X-tag so that such noise words are replaced with the letter "X".

Parallel Parse-Forest Generation:

The parser 12 uses a high-level general parsing strategy to describe and parse each topic separately, and generates tags and maps them to the input stream. Due to the nature of unstructured input text 218, each individual topic parser preferably accepts as large a language as possible, ignoring all but important words, dealing with insertion and deletion errors. The parsing of each topic involves designing context-sensitive grammar rules using a meta-level specification language, much like the ones used in LR parsing. Examples of grammars include grammar A 240 and grammar B 242. Using the present invention's approach, topic grammars 240 and 242 are described as if they were an LR-type grammar, containing redundancies and without eliminating shift and reduce conflicts. The result of parsing an input sentence is all possible parses based on the grammar specifications.

Generators 230 and 232 generate parse forests 250 and 252 for their topics. Tag-generation is done by synthesizing actual information found in the parse tree obtained during parsing. Tag generation is accomplished via tag and score generators 260 and 262 which respectively generate tags 264 and 266. Each identified tag also carries information about what set of input words in the input sentence are covered by the tag. Subsequently the tag replaces its cover-set. In the preferred embodiment, context information 267 is utilized for tag and score generations, such as by generators 260 and 262. Context information 267 is utilized in the scoring heuristics for adjusting weights associated with a heuristic scoring factor technique that is discussed below. Context information 267 preferably includes word confidence vector 268 and dialogue context weights 269. However, it should be understood that the parser 12 is not limited to using both word confidence vector 268 and dialogue context weights 269, but also includes using one to the exclusion of the other, as well as not utilizing context information 267.

Automatic speech recognition process block 217 generates word confidence vector 268 which indicates how well the words in input sentence 218 were recognized. Dialog manager 130 generates dialogue context weights 269 by determining the state of the dialogue. For example, dialog manager 130 asks a user about a particular topic, such as, what viewing time is preferable. Due to this request, dialog manager 130 determines that the state of the dialogue is time-oriented. Dialog manager 130 provides dialogue context weights 269 in order to inform the proper processes to more heavily weight the detected time-oriented words.

Synthesis of Tag-Components:

The topic spotting parser of the previous stage generates a significant amount of information that needs to be analyzed and combined together to form the final output of the local parser. The parser 12 is preferably as "aggressive" as possible in spotting each topic resulting in the generation of multiple tag candidates. Additionally in the presence of numbers or certain key-words, such as "between", "before", "and", "or", "around", etc., and especially if these words have been introduced or dropped due to recognition errors it is possible to construct many alternative tag candidates. For example, an input sentence could have insertion or deletion errors. The combining phase determines which tags form a more meaningful interpretation of the input. The parser 12 defines heuristics and makes a selection based on them using a N-Best candidate selection process. Each generated tag corresponds to a set of words in the input word string, called the tag's cover-set.

A heuristic is used that takes into account the cover-sets of the tags used to generate a score. The score roughly depends on the size of the cover-set, the sizes in the number of the words of the gaps within the covered items, and the weights assigned to the presence of certain keywords. In the preferred embodiment, ASR-derived confidence vector and dialog context information are utilized to assign priorities to the tags. For example applying channel-tags parsing first potentially removes channel-related numbers that are easier to identify uniquely from the input stream, and leaves fewer numbers to create ambiguities with other tags. Preferably, dialog context information is used to adjust the priorities.

N-Best Candidates Selection

At the end of each pass, an N-best processor 270 selects the N-best candidates based upon the scores associated with the tags and generates the topic-tags, each representing the information found in the corresponding parse-tree. Once topics have been discovered this way, the corresponding words in the input can be substituted with the tag information. This substitution transformation eliminates the corresponding words from the current input text. The output 280 of each pass is fed-back to the next pass as the new input, since the substitutions may help in the elimination of certain ambiguities among competing grammars or help generate better parse-trees by filtering out overlapping symbols.

Computation ceases when no additional tags are generated in the last pass. The output of the final pass becomes the output of the local parser to global parser 162. Since each phase can only reduce the number of words in its input and the length of the input text is finite, the number of passes in the fixed-point computation is linearly bounded by the size of its input.

The following scoring factors are used to rank the alternative parse trees based on the following attributes of a parse-tree:

Number of terminal symbols.

Number of non-terminal symbols.

The depth of the parse-tree.

The size of the gaps in the terminal symbols.

ASR-Confidence measures associated with each terminal symbol.

Context-adjustable weights associated with each terminal and non-terminal symbol.

Each path preferably corresponds to a separate topic that can be developed independently, operating on a small amount of data, in a computationally inexpensive way. The architecture of the natural language parser 12 is flexible and modular so incorporating additional paths and grammars, for new topics, or changing heuristics for particular topics is straight forward, this also allows developing reusable components that can be shared among different systems easily.

From the foregoing it will be appreciated that the present invention is well adapted to providing useful information obtained from the internet to the TV viewer. The speech-enabled, natural language interface creates a user friendly, easy to use system that can greatly enhance the enjoyment and usefulness of both television and the internet. The result of using the system is a natural blend of passive television viewing and interactive internet information retrieval.

While the invention has been described in its presently preferred embodiment, it will be understood that the invention is capable of modification without departing from the spirit of the invention as set forth in the appended claims.

What is claimed is:

1. A system for accessing supplemental network-resident information about an audio/video program comprising:

a network connection through which network-resident information may be obtained;

a speech recognizer receptive of a user's input speech request for information about a program;

a natural language parser coupled to said speech recognizer for extracting a semantic representation of the user's request for information;

a data store for storing a representation of an electronic program guide, said program guide having an indicator identifying the program being enjoyed by said user at the time of said user's request;

a search engine commander that issues at least one search request to at least one search engine through said network connection, wherein said search engine commander issues said at least one search request based on said semantic representation and using said representation of an electronic program guide as a first filter to constrain said search request to identify useful information relevant in determining what information the user is interested in retrieving;

a search results processor for receiving search results in response to said search request, for filtering said received search results based on the electronic program guide, and for providing a filtered portion of the received search results to the user as information about an audio/video program; and at least one second filter, said second filter being used by said search results processor for selecting a first group of search results from said received search results and setting aside a second group of search results from said received search results, said second filter being customizable by the user; and updating said information filters on a per-user basis based on historical data gathered as said use of the system.

2. The system of claim 1 further comprising, speech synthesizer coupled to said search results processor for providing the user with synthesized speech information about an audio/video program.

3. The system of claim 1 wherein said network connection provides connection to the internet.

4. The system of claim 1 wherein said search engine accesses at least one predefined site containing information about predefined topics pertaining to an audio/video program.

5. The system of claim 1 wherein said search engine commander includes a user profile data store for storing historical data about prior requests by the user for information.

6. The system of claim 1 wherein said search engine commander includes a mechanism for updating the contents of said electronic program guide data store.

7. The system of claim 1 wherein said natural language parser includes a set of predefined goal-oriented grammars.

8. The system of claim 1 wherein said natural language parser includes a data store for storing a set of grammars that are downloaded through said network connection.

9. A method of conducting a search for network-resident information about an audio/video program, comprising the steps of:

processing a user's input speech request for information about a program to generate a semantic representation;

formulating a search engine search request based on said semantic representation;

accessing a stored electronic program guide and using an electronic program guide to constrain said search request to identify useful information relevant in determining what information the user is interested in retrieving, said programming guide having an indicator identifying the program being enjoyed by said user at the time of said user's request;

sending said constrained search request to at least one search engine over a network;

receiving search results from said at least one search engine;

filtering said received search results based on the electronic program guide; and filtering said received search results for selecting a first group of search results from the said received search results and discarding a second group of search results from said received search results, said second filter being customizable by the user; and updating said information filters on a per-user basis based on historical data gathered as said use of the system.

10. The method of claim 9 further comprising providing said received search results to a speech synthesizer for generation of synthesized speech information.

11. The method of claim 9 further comprising periodically updating a data store containing said stored electronic program guide.

12. The method of claim 9 wherein said processing a user's input speech includes using a natural language parser.

13. The method of claim 12 further comprising downloading at least one grammar over said network and using said grammar with said natural language parser.

* * * * *